United States Patent
Lekutai

(10) Patent No.: US 11,810,407 B2
(45) Date of Patent: *Nov. 7, 2023

(54) SELECTING V2X COMMUNICATIONS INTERFACE

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,397

(22) Filed: Mar. 16, 2022

(65) Prior Publication Data

US 2022/0207928 A1 Jun. 30, 2022

Related U.S. Application Data

(63) Continuation of application No. 16/526,821, filed on Jul. 30, 2019, now Pat. No. 11,308,736.

(51) Int. Cl.
*G07C 5/00* (2006.01)
*H04W 4/40* (2018.01)
(Continued)

(52) U.S. Cl.
CPC .......... *G07C 5/008* (2013.01); *G07C 5/0808* (2013.01); *G07C 5/0816* (2013.01); *H04W 4/024* (2018.02);
(Continued)

(58) Field of Classification Search
CPC .... G07C 5/008; G07C 5/0808; G07C 5/0816; G07C 5/00; G07C 5/08; H04W 4/024;
(Continued)

(56) References Cited

U.S. PATENT DOCUMENTS 6,028,537 A 2/2000 Suman et al.
10,242,580 B2 3/2019 Groden et al.
(Continued)

OTHER PUBLICATIONS

U.S. Appl. No. 16/526,821, Notice of Allowance dated Dec. 20, 2021, 18 pages.
U.S. Appl. No. 16/526,821, Office Action dated Aug. 19, 2021, 26 pages.

*Primary Examiner* — Yonel Beaulieu
(74) *Attorney, Agent, or Firm* — Han Santos, PLLC

(57) ABSTRACT

Techniques are described herein for facilitating V2X communications using a connected vehicle platform. The techniques include receiving, from an onboard diagnostics (OBD) accessory device, a vehicle report comprising vehicle data of a vehicle equipped with the OBD accessory device, the vehicle located at a target location. An additional vehicle located within a predetermined distance of the target location is identified. The additional vehicle is equipped with an onboard diagnostics unit (OBU). A traffic advisory message is generated based at least on the vehicle data in the vehicle report. Thereafter, the techniques include determining whether the additional vehicle is located within a communication range of the vehicle and in response to making a determination that the additional vehicle is located outside of the communication range of the vehicle, the traffic advisory message is broadcasted to the OBU of the additional vehicle.

20 Claims, 5 Drawing Sheets

(51) Int. Cl.
 *H04W 4/024* (2018.01)
 *G07C 5/08* (2006.01)
 *H04W 8/00* (2009.01)
 *H04W 4/02* (2018.01)

(52) U.S. Cl.
 CPC ............ *H04W 4/025* (2013.01); *H04W 4/40* (2018.02); *H04W 8/005* (2013.01)

(58) Field of Classification Search
 CPC ....... H04W 4/025; H04W 4/40; H04W 8/005; H04W 8/08; H04W 4/00; H04W 4/02; H04W 8/00
 See application file for complete search history.

(56) References Cited

U.S. PATENT DOCUMENTS

| | | |
|---|---|---|
| 10,372,141 B2 | 8/2019 | Donnelly et al. |
| 11,055,991 B1 | 7/2021 | Mulligan et al. |
| 11,308,736 B2 * | 4/2022 | Lekutai ................ G07C 5/0808 |
| 2009/0024419 A1 * | 1/2009 | McClellan ............ G06Q 40/08 |
| | | 705/4 |
| 2015/0005981 A1 | 1/2015 | Grimm et al. |
| 2017/0039784 A1 | 2/2017 | Gelbart et al. |
| 2019/0123814 A1 | 4/2019 | Martin et al. |
| 2020/0327806 A1 * | 10/2020 | Lekutai ................... H04W 4/44 |
| 2021/0235240 A1 | 7/2021 | Bandi et al. |
| 2021/0243782 A1 | 8/2021 | Miao |

\* cited by examiner

SELECTING V2X COMMUNICATIONS INTERFACE

PRIORITY CLAIM

This application is a continuation of and claims priority from U.S. Pat. No. 11,308,736, issued on Apr. 19, 2022, entitled "SELECTING V2X COMMUNICATIONS INTERFACE," which is hereby incorporated by reference as if fully set forth herein.

BACKGROUND

Vehicle communication systems can comprise vehicle-to-everything (V2X) communication software or programs that can be used to facilitate the transmission of information from a vehicle to any entity that may affect the vehicle and vice versa. V2X software generally resides at least partially in a memory unit of a vehicle's native computing system such as an onboard diagnostics unit (OBU) and enables the vehicle to act as a communication node when communicating with various entities. For example, vehicles can communicate with other vehicles, infrastructures (e.g., traffic lights), pedestrians with mobile devices, networks, and/or so forth. Thus, V2X can include components such as vehicle-to-vehicle (V2V), vehicle-to-infrastructure (V2I), vehicle-to-pedestrian (V2P), and vehicle-to-network (V2N) communications.

A vehicle's native computing system may operate with an accessory device such as an onboard diagnostics (OBD) accessory device installed in the vehicle for enhancing V2X communications that can be used for road safety and traffic efficiency purposes. An OBD accessory device may be a part of a connected vehicle platform. For instance, an OBD accessory device may utilize vehicle data from V2X communications such as forward collision warning, lane change warning, emergency electric brake light warning, and/or roadworks warning to generate traffic data and traffic advisory messages. However, OBD accessory devices generally do not communicate vehicle data to other vehicles because OBD accessory devices do not interface with OBUs in other vehicles.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
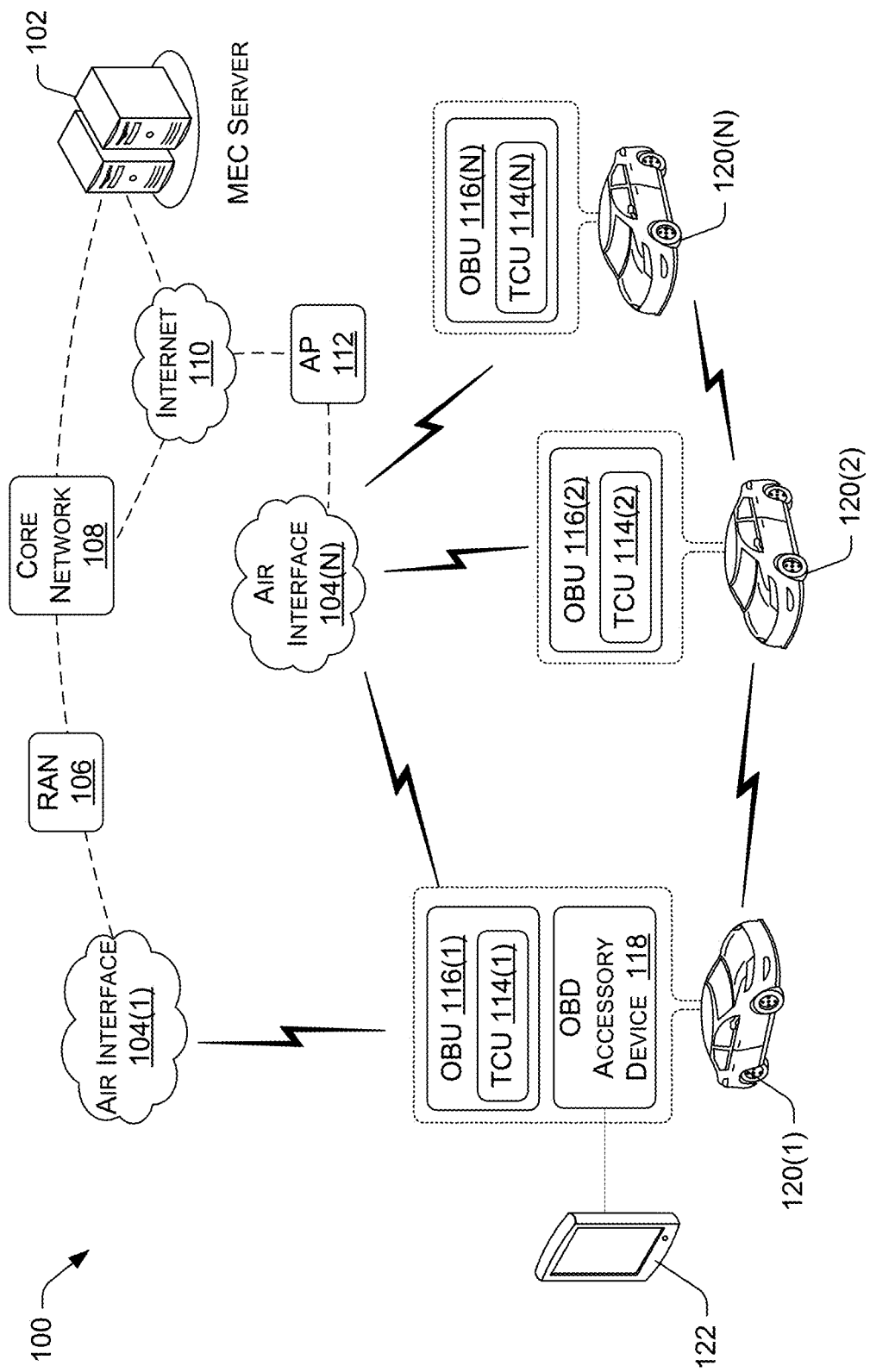
FIG. 1 illustrates an example of network architecture for facilitating communication between vehicles equipped with OBD accessory devices and/or OBU.

This disclosure is directed to techniques for facilitating communication between vehicles equipped with OBD accessory devices and OBUs. A general purpose for V2X communications is to enable vehicles to transmit and receive information about their positions, speeds, and directions to prevent vehicular accidents and manage traffic. V2X communication encompasses two interfaces. V2X communication can be a cellular-based system or a wireless local area network (WLAN) based system known as Dedicated Short Range Communications (DSRC) that provide direct communication.

More specifically, a wireless Uu interface (e.g., E-UTRAN Uu interface) connects vehicles to mobile network base stations and mobile core networks for longer-range Cooperative Intelligent Transport Systems (C-ITS) communications, such as the provision of Internet and V2N communication. V2N is a type of V2X communication where a vehicle and a serving entity using V2N application are two main agents of the communication and can communicate with each other through an LTE network entity, operating in the traditional mobile broadband spectrum. This means that information can be broadcasted over a greater range of more than one kilometer in distance. However, information may be broadcasted to vehicles that are not located near a location of interest, and vehicles may receive an unnecessarily large amount of information that may not affect its traffic-related decision making.

While cellular based V2X can provide a higher percentage of successful data packet delivery and communication range than WLAN based V2X, low-latency and high-reliability of the passing of information or data packet delivery in V2X communication are crucial to reduce the number of fatalities and serious injuries caused by motor accidents. Thus, communication between two or more vehicles using V2V communication, a type of V2X communication where two vehicles are main agents of the communication, may be facilitated using short-range C-ITS short-range technologies such as 3GPP LTE-V2X PC5 (LTE side-link) and/or IEEE 802.11p (ITS-G5). A direct communications interface (PC5) is used for communication between two vehicles supportive of proximity service (ProSE). Generally, the PC5 interface is implemented over a short range of less than one kilometer in distance. Thus, information may be broadcasted to a more targeted group of vehicles positioned near a location of interest. Similarly, 802.11p is an extension of 802.11a (Wi-Fi) and can be used for direct communications and connecting V2V and V2I.

In one aspect, a vehicle can comprise an OBD accessory device at least partially residing in a vehicle. The OBD accessory device can include a plug-in component or another communication interface for physically connecting to the vehicle (e.g., via OBD-II, diagnostics port, etc.). The OBD accessory device may comprise various hardware and software components configured to scan, read, and/or collect vehicle data from the vehicle's native OBD device. For example, the vehicle data can include speed data, vehicle disturbance data, movement data, braking data, vehicle warning system codes (e.g., low battery), and/or so forth. Additionally, the OBD accessory device can comprise a Global Positioning System (GPS) component for collecting location data or GPS data.

In some aspects, the OBD accessory device can be a component of a connected vehicle platform. Thus, the OBD accessory device also includes a communication device for transmitting vehicle reports comprising vehicle data to a network entity. In one aspect, the OBD accessory device sends the vehicle report to a base station (e.g., eNode B) via the Uu interface, and then the base station broadcasts specific ITS messages based at least on the vehicle report. ITS messages can comprise intersection collision warning, emergency brake warning, left turn assist, traffic jam warning, vulnerable road user warning, and/or so forth. The ITS messages can also include a map highlighting congested areas, high traffic areas, road closures and repairs, construction zones, and other target areas that affect traffic.

The ITS messages may be broadcasted to a selected group of vehicles comprising additional OBD accessory devices subscribed to communications services provided by a telecommunications service provider. Additionally, or alternatively, messages may also be transmitted to OBUs in vehicles that are not equipped with OBD accessory devices to facilitate communications between OBD accessory devices and OBUs in different vehicles. In some aspects, an OBD accessory device may, based at least on making a determination that a vehicle is located within a communication range, utilize PC5 interface or Wi-Fi to communicate with the vehicle without assistance from a mobile network. Accordingly, the OBD accessory device may be PC5 capable.

The techniques described herein may be implemented in a number of ways. Example implementations are provided below with reference to the following figures.

Example Network Architecture

FIG. 1 illustrates example architecture for facilitating communication among vehicles equipped with OBD accessory devices and/or OBUs. The architecture may include one or more vehicles 120(1)-120(N). The vehicles 120(1)-120(N) can include a DSRC system or another short-range, medium-range, or long-range wireless communication system. For instance, the individual vehicles 120(1)-120(N) may comprise an OBU 116(1)-116(N) comprising a telematic control unit (TCU) 114(1)-114(N) that may facilitate communication with the network 100 and perform various tracking features for the vehicles 120(1)-120(N). In some embodiments, the TCUs 114(1)-114(N) may include an integrated or separate telecommunications transceiver (e.g., cellular, Wi-Fi, satellite, etc.), a global positioning system (GPS) transceiver, and a controller for interfacing with other components of the network 100.

The TCUs 114(1)-114(N) may communicate with an access network (e.g., a radio access network (RAN) 106, an access point (AP) 112, etc.) over a physical communications interface or network access technologies. For example, the air interfaces 104(1)-104(N) may serve the TCUs 114(1)-114(N) over a local wireless connection. The air interfaces 104(1)-104(N) can comply with a given cellular communications protocol. For example, the network can implement 2G, 3G, 4G, 5G, long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The RAN 106 can include a plurality of APs that serve the TCUs 114(1)-114(N) over air interfaces 104(1)-104(N). An AP in the RAN 106 can be referred to as an access node (AN), a base station, Node B, evolved Node B (eNode B), and/or so forth. An AP can be a terrestrial access point or a satellite access point. The RAN 106 connects to a core network 108 that can perform a variety of functions, including mediating an exchange of packet-switched (PS) data with external networks such as the Internet 110. The Internet 110 can include a number of routing agents and processing agents (not shown).

In the illustrated embodiment, the AP 112 may be separate from the RAN 106. The AP 112 can be connected to the Internet 110 independent of the core network 108. The core network 108 can provide one or more communications services (e.g., voice-over-Internet Protocol (VoIP) sessions, push-to-talk (PTT) sessions, group communication sessions, etc.) for the TCUs 114(1)-114(N) that connect to the core network 108 via the RAN 106 and/or the Internet 110.

The network 100 as illustrated in FIG. 1 includes a plurality of network nodes, including a base station (i.e., AP 112). Various operations performed for communication with the TCUs 114(1)-114(N) may be performed by the base station or network nodes other than the base station. In the illustrated embodiment, the architecture includes a mobile edge computing (MEC) server 102 that may perform one or more operations for supporting communication to and from the TCUs 114(1)-114(N). The MEC server 102 may interface with the TCUs 114(1)-114(N). The MEC server 102 can be deployed at a base station, a Radio Network Controller (RNC), or any other common wireless or wireline network access technologies that are part of the network 100.

Additionally, or alternatively, the MEC server 102 can be deployed at other facilities or infrastructures (e.g., traffic lights, road signs). The MEC server 102 can provide computing resources, storage capacity, connectivity, and access to RAN information. For instance, the MEC server 102 may provide a cache for receiving and caching data. The MEC server 102 may also store data in a distributed storage system, in which data may be stored for long periods of time and replicated to guarantee reliability. Accordingly, the MEC server 102 may provide a distributed computing environment for application and service hosting.

For example, the MEC server 102 may provide data and processing redundancy, in which data processing and data storage may be scaled in response to the demand to offload data and/or computational load as needed. In this regard, the MEC server 102 can include a plurality of physical machines that may be grouped together and presented as a single computing system. Each physical machine of the plurality of physical machines may comprise a node in a cluster. The MEC server 102 may also be in the form of virtual machines, such as virtual engines (VE) and virtual private servers (VPS). Thus, the MEC server 102 can serve virtually in the network clouds.

The MEC server 102 can support a multitenancy run-time and hosting environment for various software applications and provides a set of middleware application and infrastructure services. Software applications can be provided from equipment vendors (e.g., original equipment manufacturers (OEMs)), telecommunications service providers, and/or third parties working with the equipment vendors and/or telecommunications service providers. Generally, the MEC server 102 may be operated by a telecommunications service provider or a third-party entity that is working with the telecommunications service provider. While the illustrated embodiment includes the MEC server 102, other embodiments can include other types of servers that may include general-purpose computers, such as desktop computers, tablet computers, laptop computers, servers (e.g., on-premise servers), or other electronic devices that are capable of receiving input, processing the input, and generating output data.

The individual OBUs 116(1)-116(N) may be equipped with hardware tapped into the vehicle controller area network (CAN) bus and software elements that can extract CAN message signals to obtain the vehicle's onboard sensor measurements. Additionally, the OBUs 116(1)-116(N) may be configured with software instructions for providing vehicle fault detection, collision warning, and/or lane departure warning, among other safety operations based at least on the vehicle's onboard sensor measurements. One or more of the vehicles 120(1)-120(N) further comprise an onboard diagnostics unit port (not pictured), which may be a physical port (e.g., OBD-II) allowing a wired connection to the vehicle for providing diagnostics, maintenance, and other functions. In the illustrated embodiment, the first vehicle 120(1) comprises an OBD accessory device 118 that may be connected to the first vehicle's 120(1) onboard diagnostics unit port.

The OBD accessory device 118 may include a communication interface to communicate with the network 100, which includes the RAN 106 comprising a plurality of APs that can serve the OBD accessory device 118 over air interfaces 104(1)-104(N). The OBD accessory device 118 can also comprise a subscriber identification module (SIM) card having a unique OBD accessory device identifier such as an Integrated Circuit Card Identifier (ICCID) and an International Mobile Equipment Identity (IMEI) number. The OBD accessory device 118 can be associated with subscriber indicia such as the subscriber account identifier to enable a telecommunications service provider of the network 100 to identify the subscriber as a current, active subscriber. The subscriber indicia and the OBD accessory device identifier can be associated with a subscriber account of a telecommunications service for billing or other related services provided by a telecommunications service provider.

The OBD accessory device 118 may be paired with user equipment (UE) 122 such as a mobile device, which may be associated with the same subscriber account identifier. The UE may provide a software application (not pictured) that may facilitate communications with the air interfaces 104(1)-104(N) or other network entities such as the MEC server 102. Additionally, the application may enable users to create or sign into a user account, add or remove vehicles, view or edit vehicle information, view and share trip history, define geofences, view and share driving reports, customize mobile hotspot settings, customize communication settings, request roadside assistance, receive traffic advisory messages, and/or so forth.

The OBD accessory device 118 may transmit vehicle data over one or more of the air interfaces 104(1)-104(N) via the Uu interface or other radio interfaces. For example, the OBD accessory device 118 may be configured to transmit vehicle data to the MEC server 102 via LTE by way of the first air interface 104(1). In another example, the OBD accessory device 118 may be configured to transmit vehicle data to the MEC server 102 via Wi-Fi by way of the second air interface 104(N). The OBD accessory device 118 can exchange information such as the vehicle's position, speeds, directions, and/or other vehicle data. However, before communicating over the one or more of the air interfaces 104(1)-104(N), the OBD accessory device 118 must first be activated with the MEC server 102. Thus, the application can include an onboarding feature for activating the OBD accessory device 118, which is configured to register a unique identifier of the OBD accessory device to the MEC server 102. In some aspects, the International Mobile Equipment Identity (IMEI) number of the OBD accessory device 118 or the integrated circuit card identifier (ICCID) of the subscriber identification module (SIM) card of the OBD accessory device 118 may be used.

The OBD accessory device 118 is configured to collect vehicle information, such as the vehicle's VIN, odometer, vehicle status, trip information, driving reports, and/or so forth. The trip information can include a map of individual trips, rapid accelerations, harsh brakes, idling, distance traveled, duration of a trip, maximum vehicle speed, average vehicle speed, maximum revolutions per minute (RPM), fuel efficiency, and/or so forth. The vehicle data collected at the OBD accessory device can be used to generate a vehicle report, which can then be transmitted to the MEC server 102. Based at least on the vehicle report, the MEC server 102 can generate a traffic advisory message. In various embodiments, the traffic advisory message can comprise an ITS message. More specifically, if the vehicle report indicates that there are unsafe road conditions such as high-speed driving or weather-related conditions, the MEC server 102 can generate a traffic advisory message comprising a warning to enable subscribers to drive with caution and reduce accidents.

In various embodiments, V2X communications in the network 100 may operate using both Uu and PC5 interface. In one example, the traffic advisory message can be broadcasted to one or more vehicles 120(2), 120(N) located within a predetermined distance from the first vehicle 120(1). The vehicle report from the OBD accessory device 118 of the first vehicle 120(1) can indicate that the first vehicle 120(1) is broken down and stopped at an intersection. Upon receiving the vehicle report from the OBD accessory device 118 of the first vehicle 120(1), the MEC server 102 can generate a traffic advisory message indicating the presence of an inoperative vehicle (i.e., the first vehicle 120(1)) at a target location (i.e., the first vehicle's location). Thereafter, the MEC server 102 can send the traffic advisory message to the TCUs of the vehicles located within the predetermined distance from the first vehicle 120(1). Upon receiving the traffic advisory message, the vehicle's OBU may prompt the driver of the vehicle to make one or more traffic decisions. For example, the driver may decide to choose an alternate route for traveling.

In another example, the OBD accessory device 118 of the first vehicle 120(1) may communicate directly with the second vehicle 120(2) via the PC5 interface or via Wi-Fi (i.e., DSRC) when the second vehicle 120(2) is within a communication range of the first vehicle 120(1). Accordingly, the OBD accessory device 118 is PC5 capable. In various embodiments, the OBD accessory device 118 is configured to provide a Wi-Fi hotspot. In this way, the OBD accessory device 118 of the first vehicle 120(1) may deliver the vehicle report of the first vehicle 120(1) to the second vehicle 120(2) in sidelink, thereby eliminating the need for the second vehicle 120(2) to be equipped with an OBD accessory device to receive the vehicle report from the OBD accessory device 118 of the first vehicle 120(1).

Figure 2:
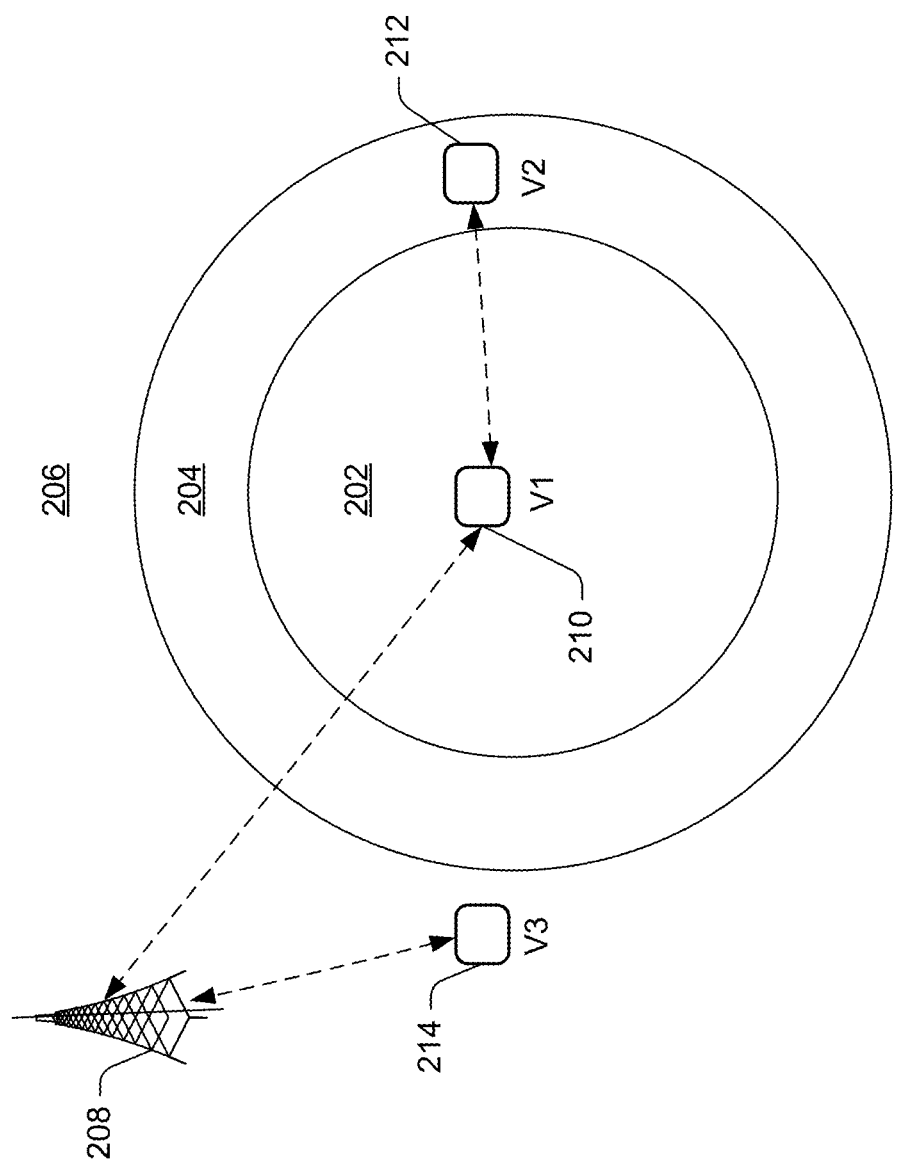
FIG. 2 is a block diagram showing various configurations for selecting V2X communications interface based at least on real-time or near real-time location data of vehicles.

FIG. 2 is a block diagram showing various configurations for communication based on location data of a plurality of vehicles. In the illustrated embodiment, various regions are presented as regions 202, 204, and 206. In one aspect, the regions are defined with respect to the first vehicle 210, which comprises an OBD accessory device. Region 202 may represent a region that is a first distance from the first vehicle 210, whereas regions 204 and 206 represent regions that are further distances from the first vehicle 210. In the illustrated embodiment, the second vehicle 212 is located in the second region 204 and the third vehicle 214 is located in the third region 206. The second vehicle 212 is a second distance from the first vehicle 210 and the third vehicle 214 is a third distance from the first vehicle 210. The second vehicle 212 and the third vehicle 214 may be equipped with an OBU.

When the second vehicle 212 is the second distance from the first vehicle 210, the second vehicle 212 is within the communication range of the first vehicle 210. Thus, the first vehicle 210 and the second vehicle 212 can communicate via the PC5 interface or via Wi-Fi. In this way, the first vehicle 210 can directly transmit vehicle data to the second vehicle 212. When the third vehicle 214 is the third distance from the first vehicle 210, the third vehicle 214 is not within the communication range of the first vehicle 210. Thus, the first vehicle 210 and the third vehicle 214 can communicate via the Uu interface instead of the PC5 interface or the Wi-Fi. In the illustrated embodiment, the first vehicle 210 may transmit a vehicle report to a base station 208 in uplink, and the base station 208 may transmit the vehicle report to the third vehicle 214 by way of a broadcast mechanism. Additionally, or alternatively, the base station 208 may transmit the vehicle report to the second vehicle 212 and the third vehicle 214. In various embodiments, the second vehicle 212 may communicate with a Road Side Unit (RSU) where the base station 208 may support connectivity to the RSU and its functions. The second vehicle 212 may transmit the vehicle information to RSUs via a similar sidelink channel or DSRC. The RSU can communicate with the vehicle 212 directly or pass on the information to the base station 208 for decision making/processing and relay the broadcasting messages back to RSU. The RSU then can broadcast the information back to the vehicle 212.

Example Computing Device Components

Figure 3:
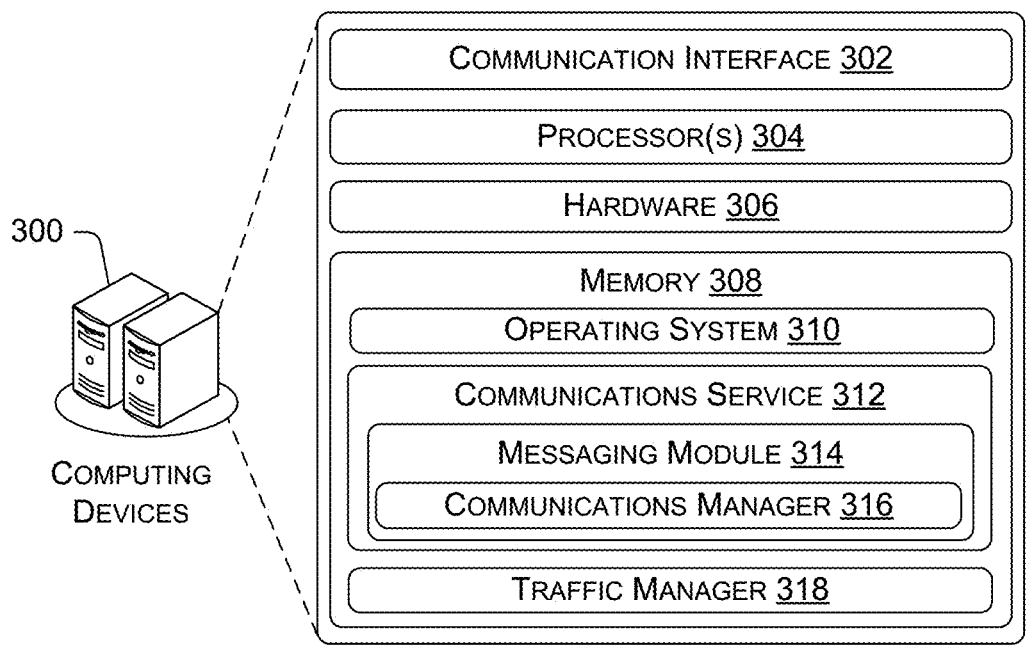
FIG. 3 is a block diagram showing various components of illustrative computing devices that select V2X communications interface and facilitate communications between a vehicle and an entity.

FIG. 3 is a block diagram showing various components of illustrative computing devices 300, wherein the computing devices 300 can comprise a MEC server. It is noted that the computing devices 300 as described herein can operate with more or fewer of the components shown herein. Additionally, the computing devices 300 shown herein or portions thereof can serve as a representation of one or more of the computing devices 300 of the present system.

The computing devices 300 may include a communication interface 302, one or more processors 304, hardware 306, and memory 308. The communication interface 302 may include wireless and/or wired communication components that enable the computing devices 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 304 may also be responsible for executing all computer applications stored in the memory, which can be associated with common types of volatile (RAM) and/or non-volatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing devices 300.

The processors 304 and the memory 308 of the computing devices 300 may implement an operating system 310, a communications service 312, and a traffic manager 318. In various embodiments, the computing devices 300 may also include a data management layer (not shown) that includes software utilities for facilitating the acquisition, processing, storing, reporting, and analysis of data from data sources such as OBD accessory devices, UEs, and/or so forth. In various embodiments, the data management layer can interface with an Application Programming Interface (API) for providing data access.

The operating system 310 may include components that enable the computing devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The communications service 312 includes a messaging module 314 comprising a communications manager 316. The communications service 312 and the traffic manager 318 can include routines, program instructions, objects, and/or data structures that perform particular tasks or implement particular abstract data types. For instance, the messaging module 314 may include one or more instructions, when executed by the one or more processors 304 to direct the computing devices 300 to perform operations related to communicating with OBD accessory devices and OBUs in the network. For example, in one aspect, upon generating a traffic advisory message, the messaging module 314 may transmit the traffic advisory message to one or more OBD accessory devices and/or OBUs. The OBD accessory devices are associated with subscribers of a telecommunications service. The messaging module 314 may implement the communications manager 316, which may include one or more instructions, when executed by the one or more processors 304 to direct the computing devices 300 to perform operations related to managing the exchange of information between the MEC server and the OBD accessory devices and/or OBUs.

For instance, the communications manager 316 may identify a subscriber account associated with an OBD accessory device using a subscriber indicia associated with the OBD accessory devices (e.g., ICCID). Based on the subscriber indicia, the communications manager 316 retrieves, from a user account database, account status associated with the subscriber indicia. If the account status is active, the communications manager 316 may enable the messaging module 314 to send the traffic advisory message to one or more additional OBD accessory devices. The communications manager 316 may also enable the messaging module 314 to send the traffic advisory message to one or more OBUs based at least on the information received from the OBD accessory device. In various embodiments, the communications manager 316 may enable the messaging module 314 to transmit emergency messages to all OBD accessory devices and/or OBUs, including OBD accessory devices that are associated with an inactive account. The communications manager 316 may also identify a vehicle driving within a predetermined distance of a target location, whereby the target location can be a location of another vehicle, such as an inoperable vehicle on a road. In one instance, the communication manager 316 can receive locations of a vehicle using the vehicle's GPS and/or assisted GPS.

The messaging module 314 may provide traffic information and/or vehicle reports from one or more OBD accessory devices to the traffic manager 318. The traffic manager 318 may include one or more instructions, when executed by the one or more processors 304 to direct the computing devices 300 to perform operations related to processing vehicle reports from an OBD accessory device and generating traffic advisory messages. The vehicle reports are associated with a particular vehicle in which the OBD accessory device is installed and the vehicle's VIN. The vehicle reports can include various vehicle-related data, such as the vehicle's location, timestamp, distance traveled, duration of a trip, diagnostic trouble codes (e.g., low battery, powertrain/vehicle speed control fault P1572 codes), disturbance to the vehicle, and/or so forth. The traffic manager 318 may identify one or more conditions from the vehicle reports that may affect traffic. For example, if a vehicle report indicates that an OBD accessory device detected harsh braking, a collision, and a deployed airbag, the traffic manager 318 can determine that the vehicle associated with the OBD accessory device was involved in an accident, which can increase traffic and cause delays on the road on which the vehicle is located.

The traffic manager 318 may reference a database for identifying conditions that can cause traffic delays. Additionally, the traffic manager 318 may request updated real-time traffic information or traffic reports from one or more traffic information systems upon identifying one or more conditions that can cause traffic delays. The traffic information can include traffic delays and road closures and conditions, including weather information. Additionally, the traffic information can include average travel time between two or more locations, average vehicle speed on various roads and highways, bicyclists and pedestrian traffic information, travel alerts, and/or so forth. Based at least on the traffic information or traffic reports received from one or more traffic information systems, the traffic manager 318 may automatically detect an anomaly in traffic patterns and traffic trends, depending upon embodiments. If the traffic manager 318 determines that an accident occurred in the above example, the traffic manager 318 may request updated traffic information to obtain the most up-to-date average travel time between two or more locations, average vehicle speed on various roads and highways, travel alerts, and/or so forth.

The traffic manager 318 may generate a traffic advisory message based at least on the traffic information and/or the vehicle reports. In this regard, the traffic manager 318 may implement one or more data filtering tools that use pre-defined rules and algorithms to generate a traffic advisory message. For example, if the traffic manager 318 determines that one or more conditions from the vehicle reports indicate an increase in traffic or traffic delays, the traffic manager 318 may generate a message recommending a driver take an alternate route. In another example, if the traffic manager 318 identifies unsafe road conditions due to inclement weather, the traffic manager 318 may generate a message recommending a driver reduce speed or drive with caution. In yet another example, if the traffic manager 318 identifies road obstacle or construction, the traffic manager 318 may generate a message warning a driver of nearby road repairs. The traffic manager 318 may provide the generated traffic advisory messages to the messaging module 314. The messaging module 314 may transmit the messages to the OBD accessory devices and/or OBUs in the network.

Example Processes

Figure 4:
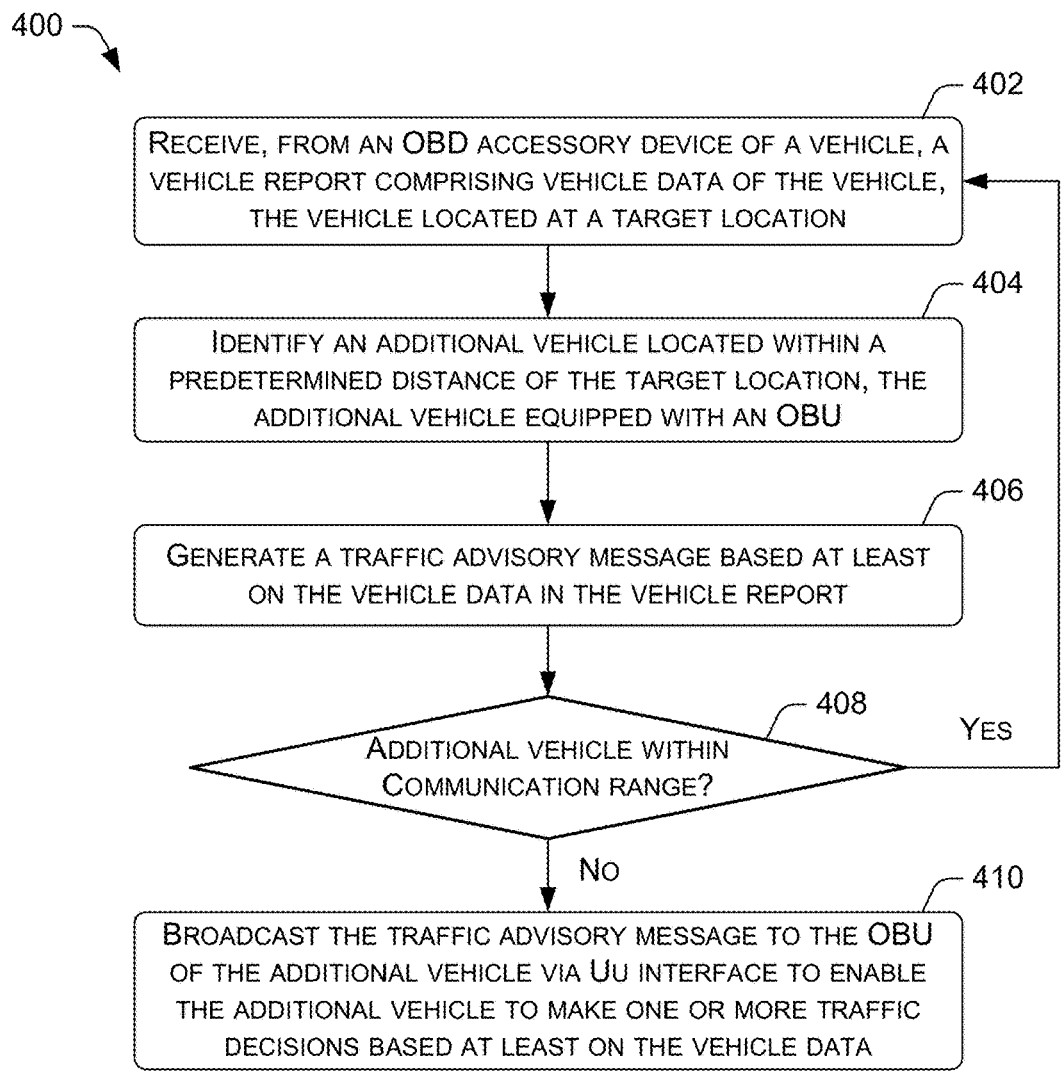
FIG. 4 is a flow diagram of an example process for broadcasting a traffic advisory message to a vehicle equipped with an OBU based at least on vehicle data from an OBD accessory device of an additional vehicle.
Figure 5:
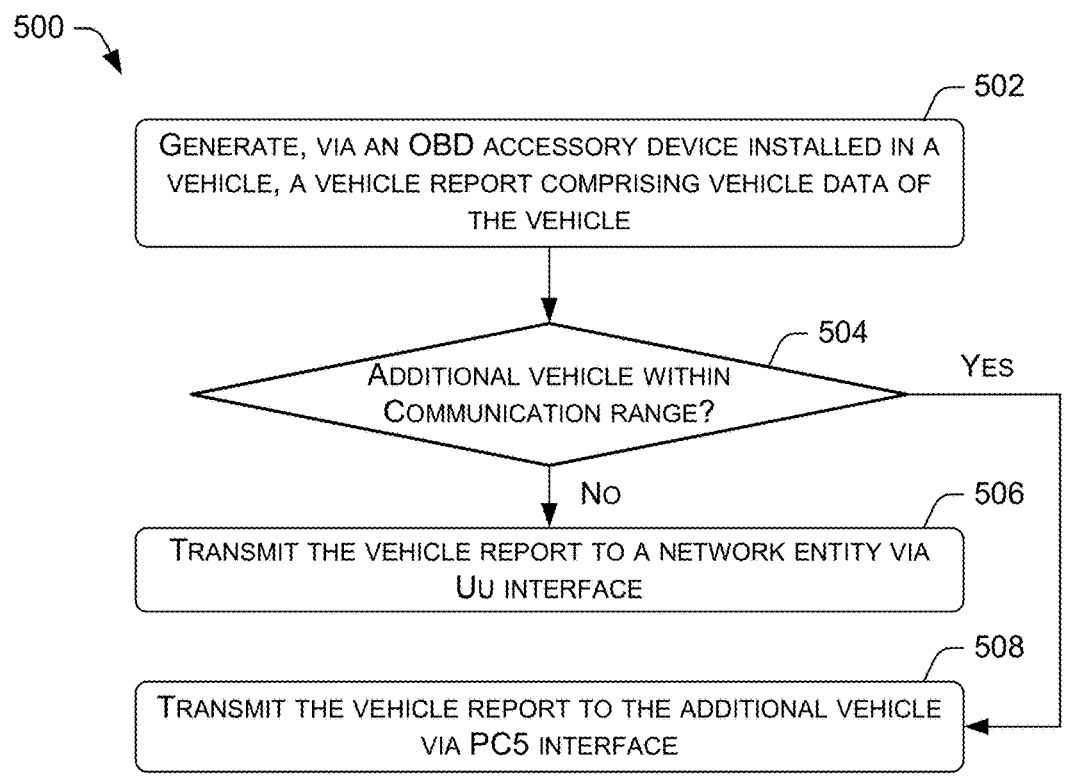
FIG. 5 is a flow diagram of an example process for selecting a V2X communications interface for transmitting a message comprising vehicle data from a vehicle equipped with an OBD accessory device to an entity.

FIGS. 4 and 5 present illustrative processes 400 and 500 for broadcasting a traffic advisory message to vehicles and selecting a communication interface for transmitting the message. The processes 400 and 500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to FIGS. 1-3.

FIG. 4 is a flow diagram of an example process 400 for broadcasting a traffic advisory message to a vehicle equipped with an OBU based at least on vehicle data from an OBU accessory device of an additional vehicle from the perspective of a MEC server. At block 402, the MEC server receives, from an OBD accessory device of a vehicle, a vehicle report comprising vehicle data of the vehicle, wherein the vehicle is located at a target location. The vehicle data may comprise speed data, vehicle disturbance data, movement data, braking data, vehicle warning system codes, and location data of the vehicle. At block 404, the MEC server identifies an additional vehicle located within a predetermined distance of the target location of the vehicle, wherein the additional vehicle is equipped with an OBU. The MEC server may identify the additional vehicle's location based at least on the additional vehicle's GPS and/or assisted GPS. At block 406, the MEC server generates a traffic advisory message based at least on the vehicle data in the vehicle report. In various embodiments, the MEC server may also utilize traffic information from one or more traffic databases in order to generate a traffic advisory message. The traffic advisory message can include an intelligent transportation system (ITS) message. In various embodiments, the MEC server may also generate a recommendation for one or more traffic decisions based at least on the traffic advisory message. Additionally, the MEC server may generate a traffic trend data based at least on the vehicle data.

At decision block 408, the MEC server determines whether the additional vehicle is within a communication range of the vehicle. If the additional vehicle is outside of the communication range of the vehicle ("no" at decision block 408), the MEC server broadcasts the traffic advisory message to the OBU of the additional vehicle to enable the additional vehicle to make one or more traffic decisions based at least on the vehicle data, as indicated in block 410. The traffic advisory message can include appropriate warning messages to help drivers avoid traffic accidents and provide better route planning. For example, if the vehicle report indicates one or more conditions that trigger traffic delays or unsafe road conditions, the recommendation module may generate a message recommending a driver take an alternate route and/or drive with caution. Conditions that trigger traffic delays or unsafe road conditions include stalled cars, road repairs or construction, overturned vehicles, weather-related conditions, road closures, vehicle accidents, and/or so forth. The MEC server may also broadcast a recommendation for one or more traffic decisions based at least on the traffic advisory message. If the additional vehicle is within the communication range of the vehicle ("yes" at decision block 408), the OBD accessory device of the vehicle can utilize the PC5 interface to transmit the vehicle data to the OBU of the additional vehicle, and the process repeats such that the MEC server receives, from an OBD accessory device of the same or an additional vehicle, a vehicle report comprising vehicle data of the vehicle.

FIG. 5 is a flow diagram of an example process 500 for selecting an interface for transmitting a message comprising vehicle data from a vehicle equipped with an OBD accessory device from the perspective of the OBD accessory device. At block 502, the OBD accessory device generates a vehicle report comprising vehicle data of the vehicle. The vehicle data may be collected using the vehicle's OBU. At decision block 504, the OBD accessory device determines whether an additional vehicle is located within its communication range. In various embodiments, the communication range may comprise a distance that allows for communication via DSRC or another short-range system. If the additional vehicle is not within the communication range ("no" at the decision block 504), the OBD accessory device transmits the vehicle report to a network entity via Uu interface, as indicated in block 506. If the additional vehicle is within the communication range ("yes" at the decision block 504), the OBD accessory device transmits the vehicle report to the additional vehicle via the PC5 interface.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, from an onboard diagnostics (OBD) accessory device, a vehicle report comprising vehicle data of a vehicle equipped with the OBD accessory device, the vehicle located at a target location;
   identifying an additional vehicle located within a predetermined distance of the target location, the additional vehicle is equipped with an onboard diagnostics unit (OBU) device;
   generating a traffic advisory message based at least on the vehicle data in the vehicle report;
   determining whether the additional vehicle is located within a communication range of the vehicle; and
   in response to making a determination that the additional vehicle is located outside of the communication range of the vehicle, broadcasting the traffic advisory message to the OBU of the additional vehicle.

2. The one or more non-transitory computer-readable media of claim 1, the acts further comprising:
   generating a recommendation for one or more traffic decisions based at least on the traffic advisory message; and
   broadcasting the recommendation to the OBU of the additional vehicle.

3. The one or more non-transitory computer-readable media of claim 1, wherein the OBD accessory device corresponds to a unique OBD accessory device identifier associated with a user account.

4. The one or more non-transitory computer-readable media of claim 1, wherein the OBD accessory device is PC5 capable.

5. The one or more non-transitory computer-readable media of claim 1, wherein the vehicle data comprises speed data, vehicle disturbance data, movement data, braking data, vehicle warning system codes, and location data of the vehicle.

6. The one or more non-transitory computer-readable media of claim 1, wherein the traffic advisory message includes an intelligent transportation system (ITS) message.

7. The one or more non-transitory computer-readable media of claim 1, wherein the acts further comprise:
   generating a traffic trend data based at least on the vehicle data.

8. The one or more non-transitory computer-readable media of claim 1, wherein the one or more non-transitory computer-readable media comprises an on-premise server.

9. A computer-implemented method, comprising:
   receiving, from an onboard diagnostics (OBD) accessory device, a vehicle report comprising vehicle data of a vehicle equipped with the OBD accessory device, the vehicle located at a target location;
   identifying an additional vehicle located within a predetermined distance of the target location, the additional vehicle is equipped with an onboard diagnostics unit (OBU) device;
   generating a traffic advisory message based at least on the vehicle data in the vehicle report;
   determining whether the additional vehicle is located within a communication range of the vehicle; and
   in response to making a determination that the additional vehicle is located outside of the communication range of the vehicle, broadcasting the traffic advisory message to the OBU of the additional vehicle.

10. The computer-implemented method of claim 9, further comprising:
- generating a recommendation for one or more traffic decisions based at least on the traffic advisory message; and
- broadcasting the recommendation to the OBU of the additional vehicle.

11. The computer-implemented method of claim 9, wherein the OBD accessory device corresponds to a unique OBD accessory device identifier associated with a user account.

12. The computer-implemented method of claim 9, wherein the OBD accessory device is PC5 capable.

13. The computer-implemented method of claim 9, wherein the vehicle data comprises speed data, vehicle disturbance data, movement data, braking data, vehicle warning system codes, and location data of the vehicle.

14. The computer-implemented method of claim 9, wherein the traffic advisory message includes an intelligent transportation system (ITS) message.

15. The computer-implemented method of claim 9, further comprising:
- generating a traffic trend data based at least on the vehicle data.

16. A system, comprising:
- one or more non-transitory storage mediums configured to provide stored computer-readable instructions, the one or more non-transitory storage mediums coupled to one or more processors, the one or more processors configured to execute the computer-readable instructions to cause the one or more processors to:
  - generate, via an onboard diagnostics (OBD) accessory device installed in a vehicle, a vehicle report comprising vehicle data of the vehicle;
  - determine whether an additional vehicle is within a communication range of the vehicle; and
  - select a communication interface to transmit the vehicle report to the additional vehicle upon making a determination that the additional vehicle is within the communication range of the vehicle.

17. The system of claim 16, wherein the communication interface comprises a PC5 interface.

18. The system of claim 16, the one or more processors further configured to:
- select an additional communication interface to transmit the vehicle report to the additional vehicle upon making a determination that the additional vehicle is not within the communication range of the vehicle.

19. The system of claim 18, wherein the additional communication interface comprises a wireless Uu interface.

20. The system of claim 16, wherein the additional vehicle comprises an onboard diagnostics unit (OBU).

* * * * *